(12) United States Patent
Guzzon et al.

(10) Patent No.: US 11,070,288 B1
(45) Date of Patent: Jul. 20, 2021

(54) OPTICAL TRANSCEIVER LOOPBACK EYE SCANS

(71) Applicant: Juniper Networks, Inc., Sunnyvale, CA (US)

(72) Inventors: Robert S. Guzzon, Santa Barbara, CA (US); Sean P. Woyciehowsky, San Jose, CA (US); Roberto Marcoccia, San Jose, CA (US); Anand Ramaswamy, Pasadena, CA (US); John Garcia, Santa Barbara, CA (US); Sudharsanan Srinivasan, Goleta, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 0 days.

(21) Appl. No.: 16/907,857

(22) Filed: Jun. 22, 2020

(51) Int. Cl.
*H04B 10/40* (2013.01)
*H04B 10/077* (2013.01)

(52) U.S. Cl.
CPC ......... *H04B 10/0775* (2013.01); *H04B 10/40* (2013.01)

(58) Field of Classification Search
CPC .. H04B 10/5161; H04B 10/503; H04B 10/40; H04B 10/0775
See application file for complete search history.

(56) References Cited

U.S. PATENT DOCUMENTS

| | | | |
|---|---|---|---|
| 9,118,411 B1* | 8/2015 | Schmidt | H04B 10/032 |
| 9,780,881 B1* | 10/2017 | Rope | H04B 10/40 |
| 10,651,949 B1* | 5/2020 | Thomas | H04B 10/0731 |
| 2017/0063466 A1* | 3/2017 | Wang | H04B 10/07955 |
| 2019/0108161 A1* | 4/2019 | Nagarajan | H04L 27/0008 |

* cited by examiner

*Primary Examiner* — Dzung D Tran
(74) *Attorney, Agent, or Firm* — Schwegman Lundberg & Woessner, P.A.

(57) ABSTRACT

An optical transceiver can be calibrated using an internal receiver side eye scan generator, and calibration values (e.g., modulator values) can be stored in memory for recalibration of the optical transceiver. The eye scan generator can receive data from the transmitter portion via an integrated and reconfigurable loopback path. At a later time, different calibration values can be accessed in memory and used to recalibrate the optical transceiver or update the calibrated values using the receive-side eye scan generator operating in loopback mode.

20 Claims, 11 Drawing Sheets

OPTICAL TRANSCEIVER LOOPBACK EYE SCANS

TECHNICAL FIELD

The present disclosure generally relates to signal amplification and more particularly to adjustment and calibration of optical transmitter and receiver components.

BACKGROUND

Modern high-speed integrated circuits have complex architectures, with millions of components such as transistors that operate in concert to transmit data at multi-gigabit data rates required by modern communication networks. One of the critical steps of manufacturing such devices is the testing and calibration of the high-speed devices to ensure the devices do not fail at a later point in time (after integration into a product). One issue with testing and calibration of such high-speed devices stems from the modern design process, in which different components of the device are designed by different companies as "off the shelf" components. To this end, automatic test equipment (ATE) can be implemented by the device engineers to efficiently test high-speed designs at the chip and wafer level. Generally, an ATE system includes one or more computer-controlled equipment or modules that interface with the device under test (DUT) to perform stress testing and analyze individual components with minimal human interaction. Current ATE systems that are configured for electronic or semiconductor devices are not configured to provide rapid testing and calibration of some modern hybrid high-speed devices, such as optical transceivers that process both electricity and light to achieve higher data rates.

BRIEF DESCRIPTION OF THE DRAWINGS

The following description includes discussion of figures having illustrations given by way of example of implementations of embodiments of the disclosure. The drawings should be understood by way of example, and not by way of limitation. As used herein, references to one or more "embodiments" are to be understood as describing a particular feature, structure, or characteristic included in at least one implementation of the inventive subject matter. Thus, phrases such as "in one embodiment" or "in an alternate embodiment" appearing herein describe various embodiments and implementations of the inventive subject matter, and do not necessarily all refer to the same embodiment. However, they are also not necessarily mutually exclusive. To easily identify the discussion of any particular element or act, the most significant digit or digits in a reference number refer to the figure ("FIG.") number in which that element or act is first introduced.

Descriptions of certain details and implementations follow, including a description of the figures, which may depict some or all of the embodiments described below, as well as discussing other potential embodiments or implementations of the inventive concepts presented herein. An overview of embodiments of the disclosure is provided below, followed by a more detailed description with reference to the drawings.

DETAILED DESCRIPTION

In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, structures, and techniques are not necessarily shown in detail.

Modern ATE systems are not configured to rapidly test, validate, and calibrate modern hybrid high-speed devices, such as optical transceivers, which include both complex electrical and optical modules at high data rates, such as 4-level pulse amplitude modulation (PAM4). To this end, a receiver side calibration system can operate in internal loopback mode to calibrate different optical components and parameters, such as modulator bias and voltage offsets for different signals in a multi-lane signal. In some example embodiments, the receiver side calibration system includes a receiver eye scan module that generates a modulation diagram, such as eye diagram, for calibration of the optical components. The eye receiver side eye scan module can be integrated om a receiver electrical circuit structure or application specific integrated circuit (ASIC) configured to receive electrical data from a photonic integrated circuit portion. In some example embodiments, the heater bias can be configured to a static value, while the optical modulator values are calibrated to generate a high quality eye diagram that can be accessed directly from the system (e.g., via data interface to a client device). In this way, an optical transceiver can be rapidly calibrated using the integrated loopback and eye scanner functions, instead of implementing costly ATE equipment, which can be difficult and slow to implement (e.g., time and effort interfacing a probe with the DUT), and risk damaging the delicate high speed transceiver. Additionally, in some example embodiments, the calibration values are stored in memory and can be utilized to periodically recalibrate the optical transceiver.

Figure 1:
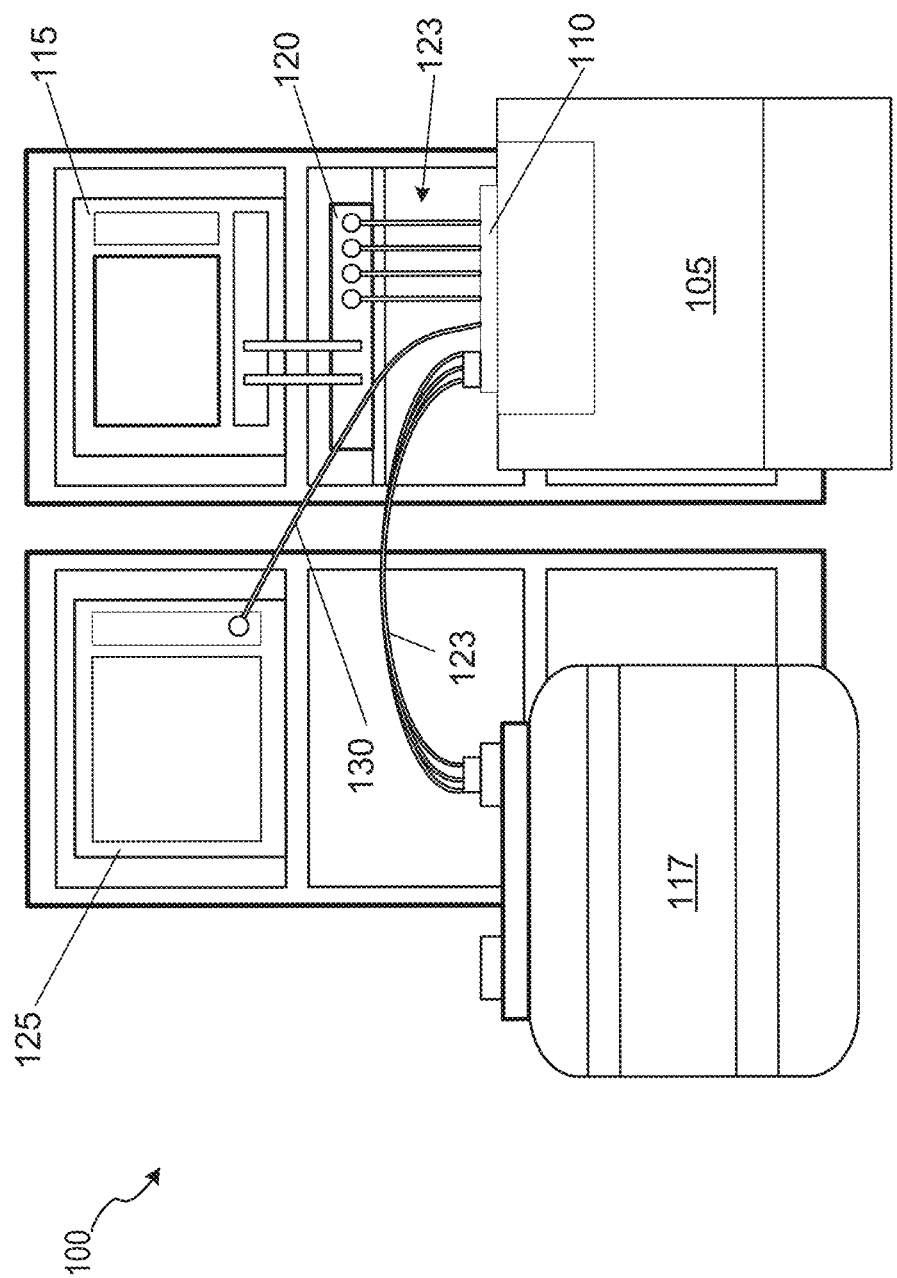
FIG. 1 shows an example opto-electrical ATE system for implementing simultaneous opto-electrical probing, according to some example embodiments.

FIG. 1 shows an example opto-electrical ATE system 100 for implementing simultaneous opto-electrical probing, according to some example embodiments. As illustrated, a probe platform 105 supports a probe module 110 (e.g., probe core, printed circuit board (PCB)/stiffener, fiber and positioner), which can include for example, the device under test situated under a probe card. The device under test or "DUT" (not illustrated in FIG. 1) includes electrical contacts that are connected to one or more electrical testing and analysis apparatuses via wires 123 (e.g., electrical cables). For example, in FIG. 1, electrical contacts of the device under test are connected to electrical test apparatuses, such as a vector network analyzer 115 (VNA), by way of a switch 120 (e.g., a 1×N radio frequency (RF) switch), and further electrical contacts of the device under test are connected to an electrical analyzer 117 (e.g., a high-speed sampling oscilloscope, such as a Digital Communication Analyzer (DCA); a system on chip/integrated circuit (SoC/IC) testing system, such as an Advantest 93k CTH testing system). The device under test can further include an optical interface (e.g., light emitter, laser, light emitting diode (LED), photodiode) to transmit and receive optical data.

The optical components of the device under test are analyzed by an optical test apparatus 125, such as an optical spectrum analyzer (OSA). The optical test apparatus 125 interfaces with the optical interface of the device under test via fiber 130, which can receive the light from the device under test via the plunger and membrane (e.g., optical keep-out area in the membrane) of the probe core, where the fiber is moveable via a positioner, as discussed in further detail below.

Figure 2:
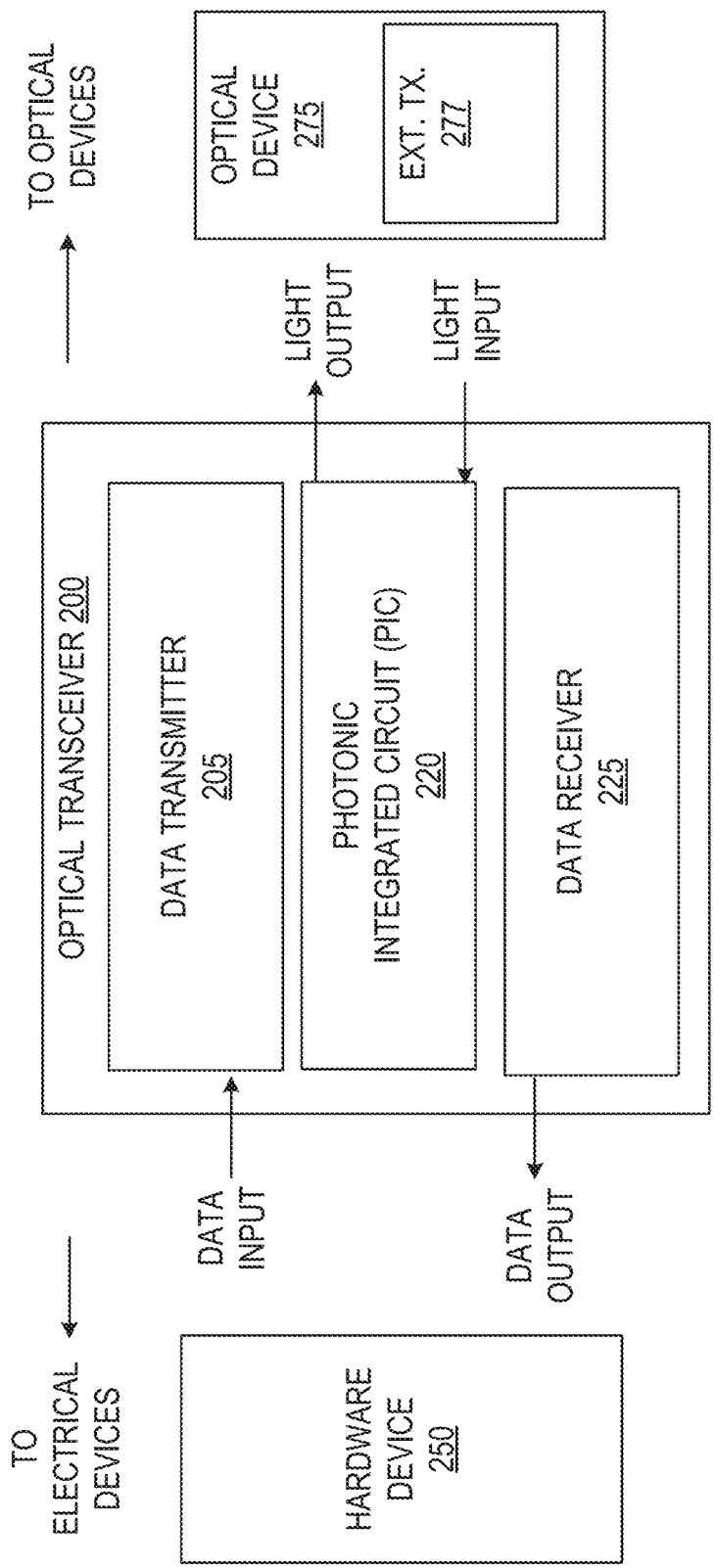
FIG. 2 is a block diagram illustrating an optical transceiver for transmitting and receiving optical signal, according to some example embodiments.

FIG. 2 is a block diagram illustrating an optical transceiver 200 for transmitting and receiving optical signal, according to some example embodiments. The optical transceiver is an example DUT transceiver system in which a receiver side loopback calibration system can be integrated and calibrated and calibration values stored in memory for later recalibration. For example, the optical transceiver 200 can be mounted on the probe module 110 for simultaneous electrical and optical testing and later integrated into a product (e.g., a host board, as a pluggable transceiver).

As illustrated, the optical transceiver 200 is implemented to interface electrical data from electrical devices, such as electrical hardware device 250; convert the electrical data into optical data; and send and receive the optical data with one or more optical devices, such as optical device 275 (e.g., an external transmitter 277 of a remote optical device, switch, server, etc.). For explanatory purposes, in the following description, the electrical hardware device 250 is a host board that "hosts" the optical transceiver 200 as a pluggable device that sends and receives data to an optical switch network, where, for example, optical device 275 can be other components of an optical switch network. However, it is appreciated that the system can be implemented to interface other types of electrical devices and optical devices. For instance, optical transceiver 200 can be implemented as a single chip on a hybrid "motherboard" that uses an optical network (e.g., waveguides, fibers) as an optical bus to interconnect on-board electrical chips that process the data after it is converted from light into binary electrical data, according to some example embodiments.

In some example embodiments, the hardware device 250 includes an electrical interface for receiving and mating with an electrical interface of the optical transceiver 200. The optical transceiver 200 may be a removable front end module that may be physically received by and removed from hardware device 250 operating as a back end module within a communication system or device. The optical transceiver 200 and the hardware device 250, for example, can be components of an optical communication device or system (e.g., a network device) such as a wavelength-division multiplexing (WDM) system or PAM4 system. For instance, a PAM4 system may include a plurality of slots reserved for a plurality of hardware device host boards.

A data transmitter 205 of the optical transceiver 200 can receive the electrical signals, which are then converted into optical signals via a photonic integrated circuit PIC 220. The PIC 220 can then output the optical signals via optical links, such as fiber or waveguides that interface with the PIC 220. The output light data can then be processed by other components (e.g., switches, endpoint servers, other embedded chips of on a single embedded system), via a network such as a wide area network (WAN), optical switch network, optical waveguide network in an embedded system, and others.

In receiver mode, the optical transceiver 200 can receive high data rate optical signals via one or more optical links to optical device 275. The optical signals are converted by the PIC 220 from light into electrical signals for further processing by data receiver 225, such as demodulating the data into a lower data rate for output to other devices, such as the electrical hardware device 250. The modulation used by the optical transceiver 200 can be quadrature phase-shift keying (QPSK), binary phase-shift keying (BPSK), polarization-multiplexed BPSK, M-ary quadrature amplitude modulation (M-QAM), and others.

Figure 3A:
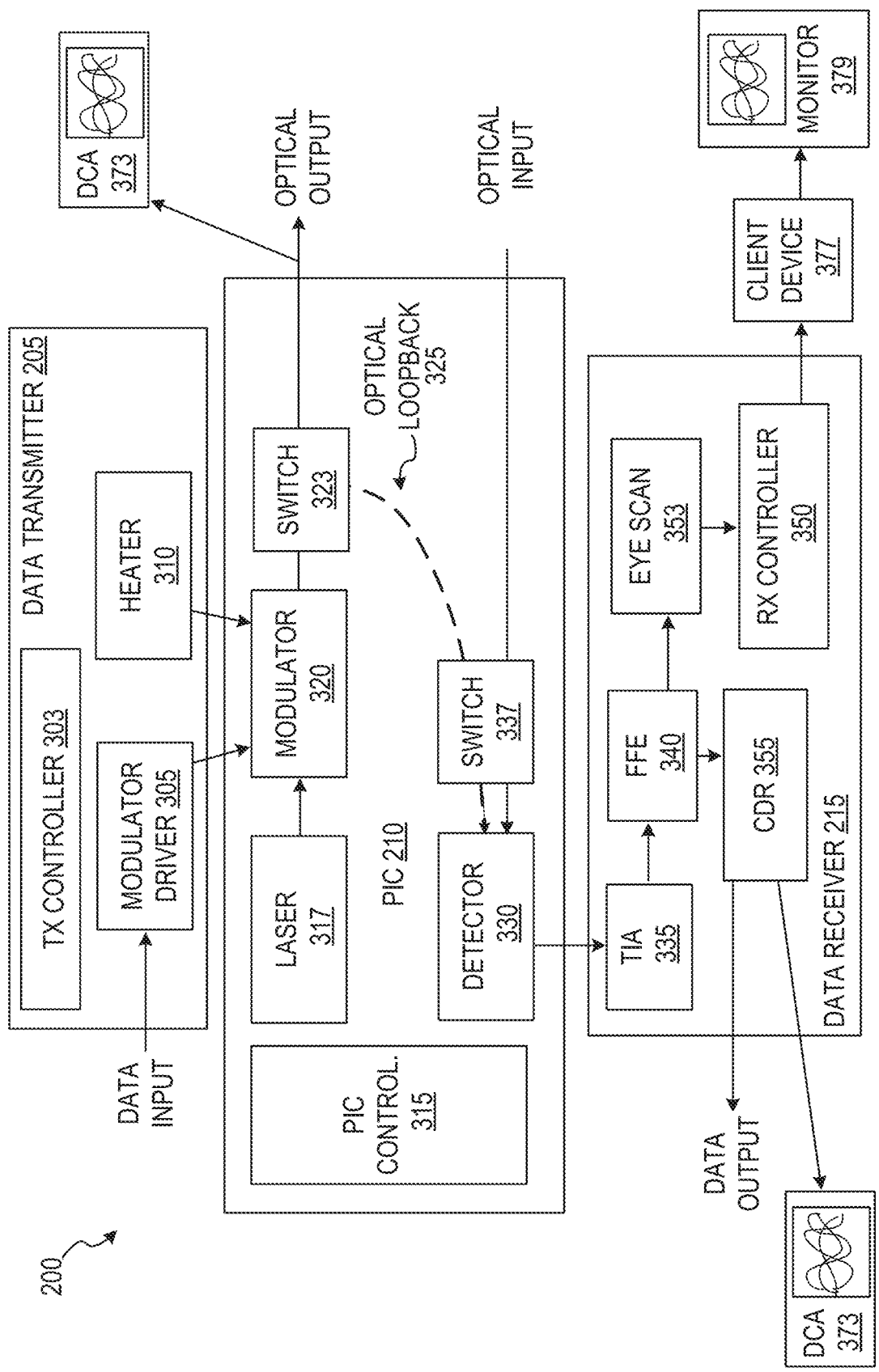
FIG. 3A shows example functional components of the optical transceiver, according to some example embodiments.

FIG. 3A shows example functional components of the optical transceiver 200, according to some example embodiments. The data transmitter 205 manages receiving electrical data and controlling components of the PIC 210 using instructions stored in a transmitter (TX) controller 303. Examples of TX controller 303 include, but are not limited to, a digital signal processing (DSP) unit, a general purpose microprocessor, an ASIC, a field programmable gate array (FPGA), a combination thereof, or other equivalent integrated or discrete logic circuitry with accompanying memory to store control instructions for execution.

In some example embodiments, the data transmitter 205 receives electrical data input from an external device, such as an external host device or host board. The transmitter controller 303 can then execute instructions that convert the electrical data into optical modulation data that the modulator driver 305 uses to control an optical modulator 320 (e.g., phase shifter, electro-absorption modulator (EAM), Mach-Zehnder Interferometer (MZI) modulator) in the PIC 210. The modulator 320 receives light from a light source such as laser 317, which then modulates the received light according to the modulation instructions (e.g., converting binary electrical data to PAM4 modulation, QPSK modulation symbol data), which is then output from the PIC 210 as output light (e.g., output light that is transmitted over an optical switch network). In some example embodiments, to compensate for environmental or device temperatures, which may affect the modulation characteristics of the optical modulator 320, the transmitter controller 303 controls a heater 310 to dynamically keep the modulator at a desired operating range. Although the example of FIG. 3A illustrates a simplified version of transmitter 205 with various components not included for brevity, it is appreciated that the transmitter 205 can include additional various components, further discussed below, and in accordance with some example embodiments.

The PIC 210 can receive optical input light (e.g., from a single mode fiber) that is detected by optical detector 330, which can use an optical element, such as a photodiode and/or other elements, to detect the photons in the received light and convert the light into electricity for demodulation processing by the data receiver 215, as discussed in further detail below.

Figure 9:
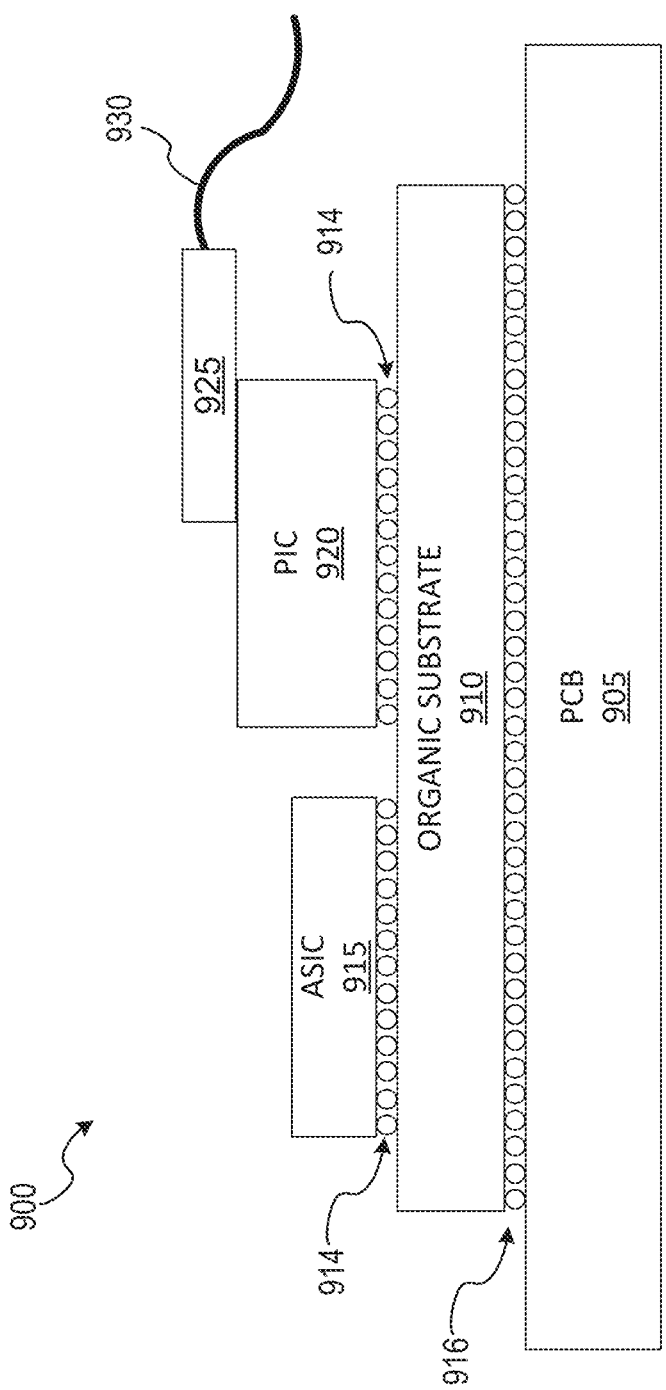
FIG. 9 is an illustration of an opto-electrical device including one or more optical devices, according to an embodiment of the disclosure.

In some example embodiments, the PIC 210 includes an optical loopback path 325 (e.g., integrated waveguide) that directs the output light immediately from the transmitting components (e.g., transmitter optical subassembly (TOSA) comprising modulator 320 and data transmitter 205) to the receiving components (e.g., a receiver optical subassembly ROSA comprising a switch 337, the optical detector 330, and also data receiver 215 that is connected via electrical contacts as in FIG. 9) to analyze and calibrate the transceiver 200 during design, testing, and manufacturing stages, as well as in the field (e.g., after integration into an end product). In some example embodiments, the transmitting components and the receiver optical components are on a single assembly and are implemented as separate circuit structures (e.g., a transmitter optical circuit and a receiver optical circuit on a single assembly).

The optical loopback path 325 allows for on-chip or intra module characterization of transceiver 200, including, but not limited to, tests such as bit error rate (BER) characterization, received power characterization, and calibration of filters (e.g., multiplexer, de-multiplexer, etc.) present in the transceiver.

In some example embodiments, the PIC 210 includes an optical switch 323 that can receive a control signal (e.g., MZI modulator path control) to direct the output of transmitting component (e.g., modulator 320) towards the receiving components (e.g., detector 330), e.g., switch the optical loopback from an inactive mode (e.g., not transmitting light along the optical loopback path 325) to active mode (e.g., transmitting a majority of light from the modulator 320 to the detector 330). In some example embodiments, the optical loopback path 325 switching elements may be comprised of (but not limited to) all or a subset of the following optical components: a semiconductor optical amplifier (SOA), a thermo-optic switch, a p-i-n diode switch, or a switch network composed of one or more multimode interference (MMI) couplers and MZIs. The addition of the switching element allows for the imposition of an electrical control signal to determine the routing of the optical signal from the transmitter. For a particular control condition, the switch could enable within PIC (or module) routing of the optical signal from the transmitter to the receiver.

For a different control condition, the same switching element could ensure that the optical signal is routed from the transmitter to the external optical link. In some example embodiments, the PIC 210 includes a further optical switch 337 that receives a control signal to receive light on the optical loopback path 325 from the transmitter components (e.g., modulator 320, switch 323). In this way, the optical transceiver 200 eliminates a need for an external optical link to the module to form an optical link between the transmit and receive paths of a transceiver, thereby eliminating external coupling calibration operations, coupling loss, external fiber-to-switch connections, and so forth. Furthermore, calibration and functional verification of the individual transmit and receive sections of a transceiver is not limited to solutions that require a physical optical connection to be made external to the unit. Moreover, when the transceiver needs to be set to "normal" operation mode, no external connection between the transmitter and receiver need be disconnected because the integrated loopback path may simply be disabled.

Although the example of FIG. 3A illustrates a simplified version of PIC 210 with various components not included for brevity, it is appreciated that the PIC 210 can include additional various components for sending and receiving light (e.g., MZIs, EAMs, multiplexers, demultiplexers, filters). Additionally, in some example embodiments, the PIC 210 includes PIC controller 315 that can control operations of the PIC components, including for example, activation of the optical loopback path 325 (e.g., via switches), monitoring/storing values of monitor photodiode integrated within the PIC 210, and other control operations.

The data receiver 215 manages receiving electrical data from the PIC 210 and processing the electrical data (e.g., amplifying filtering, demodulating) by controlling components of the receiver 215 using instructions executed and/or stored in a receiver (RX) controller 350. Examples of RX controller 350 include, but are not limited to, a DSP unit, a general purpose microprocessor, an ASIC, an FPGA, a combination thereof, or other equivalent integrated or discrete logic circuitry with accompanying memory to store control instructions for execution.

The electricity (e.g., electrical signal, electrical current) generated by the detector 330 can be converted into an amplified electrical voltage by a transimpedance amplifier 335, which is then processed by a feed forward equalizer (FFE) 340. The FFE implements one or more delays to create and combine a delayed version of the signals to filter and enhance the signal. In some example embodiments, the FFE 340 inputs the filtered electrical signal into a receiver-side eye scan generator 353 that can be implemented by the RX controller 350 to analyze the received signal (e.g., by sampling the data from FFE 340 as triggered at bit points to create eye diagram data, in which the modulated data has openings/holes, as discussed below). In some example embodiments, the receiver-side eye scan generator 353 is a circuit specifically configured to function as a sampling oscilloscope (e.g., an ASIC) that generates eye scan data (e.g., by sampling the electrical PAM4 data). To calibrate the optical receiver, a high speed analysis module, such as DCA 373, can be attached to the transceiver at different points to generate eye scan data for the transmitted optical output data or the electrical data output (e.g., from clock data recovery circuit (CDR) 355). However, the DCA 373 is generally an expensive device and may not be available in a given calibration situation. Additionally, implementing DCA 373 can be time consuming and risk damage to the transceiver in setting up the probe points. To this end, in some example embodiments, the receiver-side eye scan generator 353 can generate eye scan data for input and storage in memory of the receiver controller 350. Both the receiver-side eye scan generator 353 and receiver controller 350 are internal tools for the transceiver in that they are integrated or embedded and can readily be accessed for analysis as part of the manufacturing calibration process or later recalibration. For instance, and in accordance with some example embodiments, a client device 377 (e.g., a desktop personal computer) can interface with the RX controller using a data interface (e.g., serial data interface) or memory interface (QSDI) to access the eye scan data and display it in an eye scan diagram that is updated in realtime or near real-time on a monitor 379 of the client device.

Figure 3B:
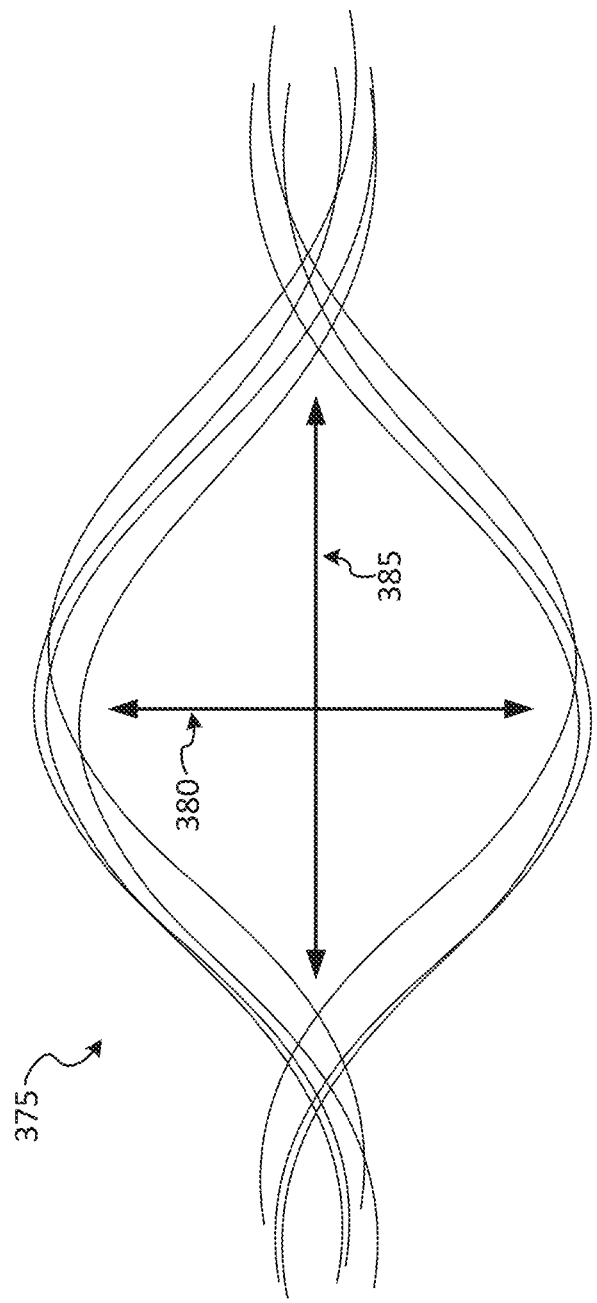
FIG. 3B shows an example of an eye scan data diagram generated from eye scan data, according to some example embodiments.

FIG. 3B shows an example of an eye scan data diagram 375 generated from eye scan data, according to some example embodiments. In some example embodiments, the eye scan diagram is generated by displaying the signal data on a scope while being triggered by the recovered clock, which folds the signal over itself to create a hole and overall shape that resembles a human eye. The eye diagram shape can be utilized to identify characteristics or a quality of a received signal (and/or issues in the transmitter). For instance, the vertical eye opening 380 indicates a margin for noise caused bit errors, while the horizontal eye opening 385 indicates a margin for timing errors due to clock or timing issues. In the example of FIG. 3B, the signal displayed is a simplified non-return to zero (NRZ) example, although other, more complex higher data rate signals can be generated by the eye scan analyzer 253, such as PAM4 eye diagrams, which can include multiple "eyes" due to the four data levels utilized in PAM4, as discussed in further detail below.

Further, and in accordance with some example embodiments, the filtered signal is then processed by a CDR module 355 to process and recover timing/clock characteristics of the data (e.g., extract the clock signal and retime the data signal), which is then further processed or is output as data (e.g., for further processing by an external device, such as hardware device 250).

Figure 4:
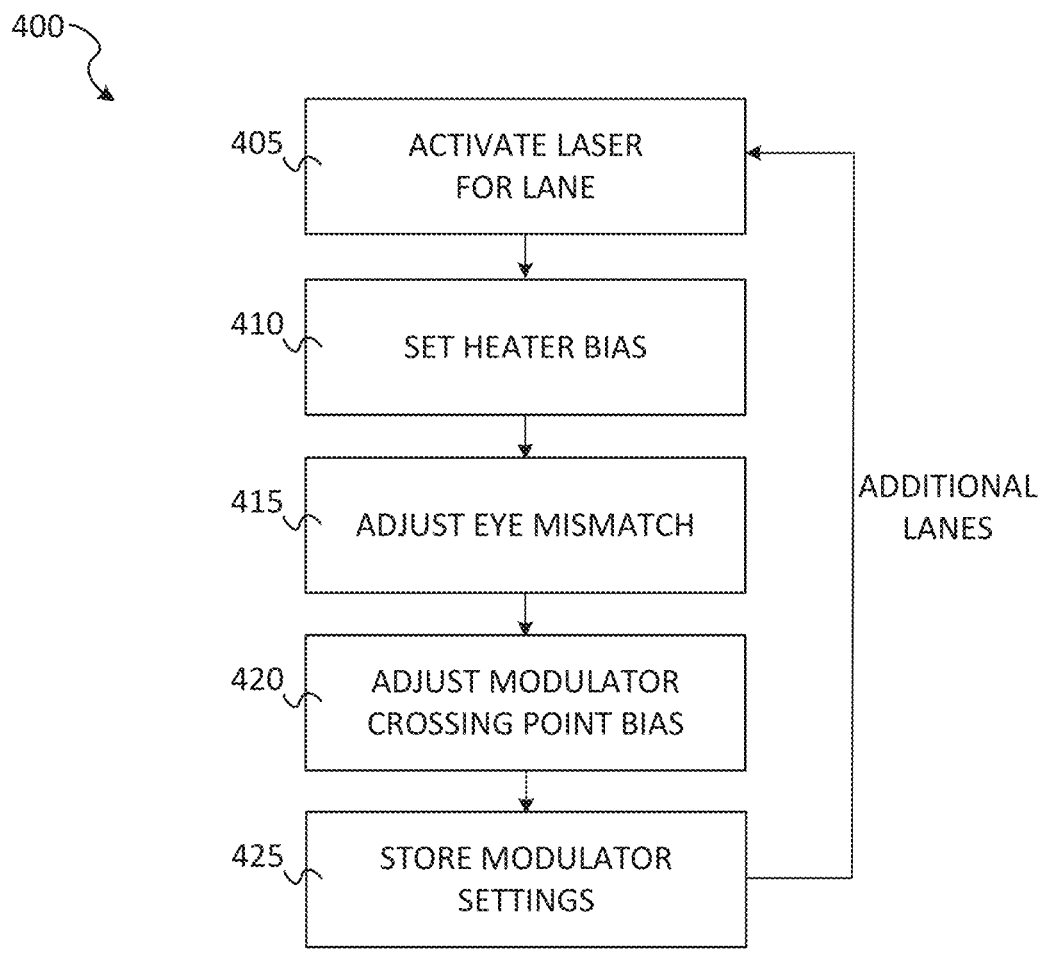
FIG. 4 shows a flow diagram of a method for receiver eye scan based calibration of an optical transceiver, according to some example embodiments.

FIG. 4 shows a flow diagram of a method 400 for receiver eye scan based calibration of an optical transceiver, according to some example embodiments. The method 400 can be performed at manufacturing time using a system, such as system 100, FIG. 1, to calibrate the device and store the calibrated settings in memory. At operation 405, a laser of a multi-signal optical transceiver is activated to generate light (e.g., a laser photodiode generates 1290 nm light at 7.5 mW). For example, the laser can generate light to be transmitted as PAM4 signal over a first fiber from a multi-gigabit optical transceiver having four fibers (e.g., each transmitting different PAM4 signal). The light generated by the laser is generated while the reconfigurable loopback path is in active mode, thereby directing the light from the transmitter portion to the receiver portion of the optical transceiver. In some example embodiments, after the light is generated, the light is modulated (e.g., using PAM4) using an optical modulator operating in half-rate mode (e.g., half-rate PAM4) to more simply calibrate the transceiver. In some example embodiments, to ensure accurate calibration during operating mode, the optical modulator is operated at full rate 4-level PAM in calibration mode.

At operation 410, the heater bias of the optical modulator is adjusted to a calibration setting heater bias. For example, the client device 377 accesses one or more of the transmitter controller 303 to adjust a setting (e.g., bias, DAC pulse width modulation (PWM) settings from 0-10,000) to change the heater bias. For example, the optical modulator can be an EAM that modulates differently at different temperatures, and at operation 410, one of the temperatures is simulated by setting the heater bias of the EAM to a constant value for calibration (e.g., a fixed alternating current value, or PWM value of a DAC), so that at a later time (e.g., during later calibration) the heater bias is again applied to provide accurate calibration results.

At operation 415, the eye mismatch in the eye pattern is adjusted. For example, the client device 377 accesses one or more of the controllers 303, 315, 350 to adjust a setting (e.g., offset, bias) to change the eye pattern shape, and/or mismatch between the eyes. The eye pattern mismatch is described as a ratio level mismatch (RLM) between the eyes of a PAM4 eye diagram. Generally, PAM4 signal comprises four evenly spaced levels (L1, L2, L3, L4) where the inner levels (L1 and L2) set the top and bottom borders of the eye patterns (openings). The default position of the inner levels are: L1=⅓*(L3−L0)+L0, and L2=⅔*(L3−L0)+L0. However, when voltage is applied to the modulator (e.g., EAM modulator), nonlinearities can arise due to physical operational characteristics of the modulator, which can affect the eye shape and cause the shape to become compressed in form (e.g., the outer eyes are compressed as L2 moves closer to L3 and L1 moves closer to L0). To this end, and in accordance with some example embodiments, the voltage offsets of the inner levels (e.g., a D1 offset for the L1 level, and a D2 offset for a the L2 level) can be adjusted to compensate for the nonlinearities, thereby correcting the RLM in the eye diagram generated by the receiver eye scanner. In particular, for example, the D1 offset for the L1 level can be adjusted to 0.0 V, and the D2 offset for the L2 level can be adjusted to 0.2 V, which then results in even eye ratios; however, it is appreciated that other offset values for the levels may be utilized until the RLM is optimized.

At operation 420, the crossing point bias of the modulator's eye pattern is adjusted so that the crossing point is approximately halfway up the vertical axis of the eye pattern diagram. For instance, while the heater of the EAM is at the calibrated heater bias setting (e.g., via operation 410), the voltage provided to the EAM is adjusted so that the crossing point of the modulated light is between 45% and 50% points in the eye diagram generated by the receiver side eye scanner. Additionally, and in some example embodiments, the crossing point is set to the intersection point of the EAM output transform graph at different bias values, as further discussed with reference to FIGS. 7 and 8 below.

At operation 425, the calibration settings (e.g., laser setting, heater setting, modulator bias crossing point setting, and RLM settings) are stored in memory of the optical transceiver for calibration at a later time. In some example embodiments, the method 400 loops back for each lane as indicated by the looping arrow from operation 425 to operation 405. For example, in a multi-gigabit optical transceiver, four different fibers may each contain PAM4 10 gigabit signal for calibration. In those example embodiments, the method 400 loops for each fiber lane, therein generating calibration settings for each component in each lane or optical channel. Further, although only a few calibration operations are discussed in the example of FIG. 4, it is appreciated that additional calibration settings can be utilized via the receive side scanner operating in loopback mode, including, for example: the peak-to-peak voltage amplitude of the modulator driver, modulator deemphasis or "DE" (e.g., frequency response compensation), extinction ratio (ER), optical modulation amplitude (OMA), and transmitter and dispersion eye closure quaternary (TDECQ, a measure of overall quality of the eye).

Figure 5:
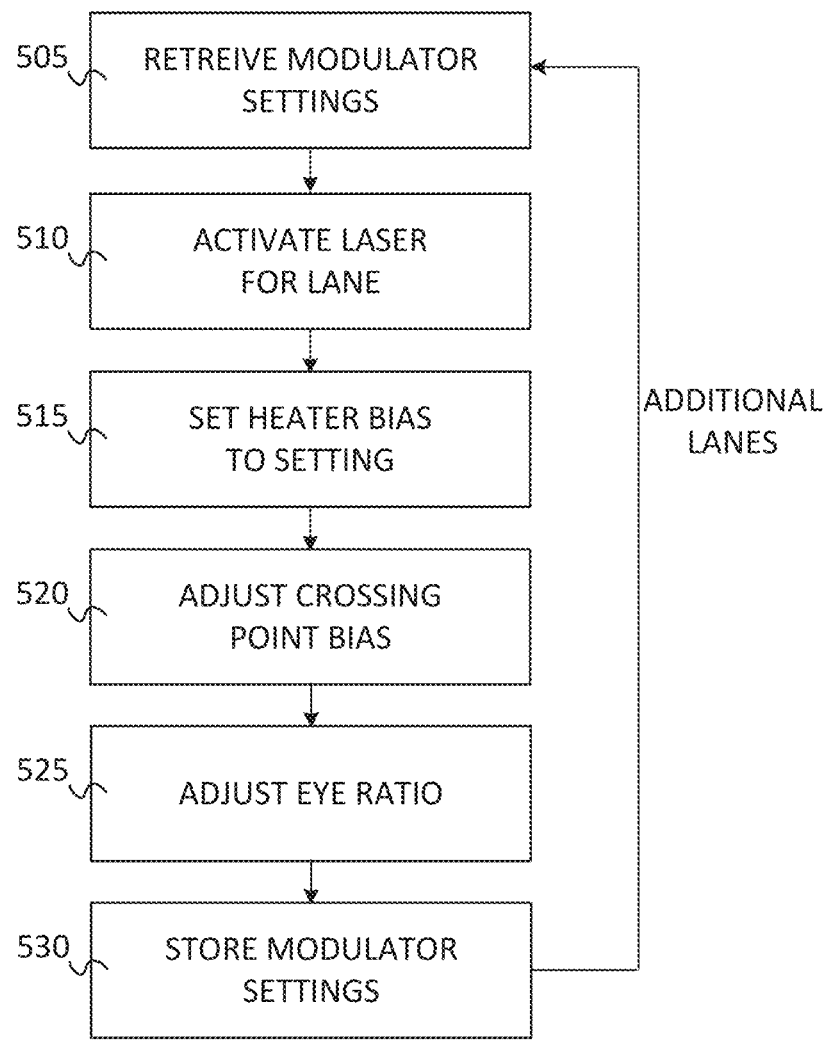
FIG. 5 shows a flow diagram of a method for calibration of an optical transceiver using stored settings and receiver-side eye scan data, according to some example embodiments.

FIG. 5 shows a flow diagram of a method 500 for calibration of an optical transceiver using stored settings and receiver-side eye scan data, according to some example embodiments. At operation 505, the stored modulated settings are accessed to perform calibration (e.g., the settings generated and stored by method 400). At operation 510, the laser is activated to generate light. For example, the first laser of the multi-signal transceiver is activated to generate light, which is then modulated by an optical modulator (e.g., EAM configured for PAM4 full-rate mode), which is then directed towards the receiver components in active loopback mode.

At operation 515, the heater of the modulator is set to the bias calibration value. For example, the EAM heater is set to 7000 PWM value of the DAC, which was used for calibration operations of method 400 (e.g., via DAC that drives the heater).

At operation 520, the crossing point bias is adjusted using the stored modulator bias value. For example, the voltage used to set the crossing point of the receiver side eye diagram between 45% and 50% is reapplied to the modulator to determine whether the stored settings indeed set the crossing point to the desired range. In some example embodiments, the calibration voltage does not set the crossing point to the desired range. In those example embodiments, the modulator voltage bias is again adjusted such that the crossing point is at 45% and 50%. For example, the voltage maybe varied or sweep tests can be performed to generate a new voltage bias that causes the receiver eye scan data to fall in the desired range.

At operation 525, the eye ratio of the eye (e.g., RLM) is analyzed in the receiver eye scan data to determine whether the RLM is still calibrated. If the ratio of the eyes is incorrect (e.g., if the middle eye is compressed), the voltage level offsets (D1, D2) for the inner levels are set to the stored values (e.g., of operation 412, FIG. 4). In some example embodiments, if the calibrated level offsets do not yield the correct RLM values (for example, due to additional nonlinearities from modulator that arise after manufacturing calibration), the offsets are then adjusted to correct the compression of the inner levels in the eye diagram.

At operation 530, updated modulator settings are stored in memory for later calibration and analysis. For example, if different, new offsets are used to correct the RLM, the newer offset values are stored in memory for later calibration.

In some example embodiments, the method 500 loops for each lane or channel as indicated by the looping arrow from operation 530 to operation 505. For example, in a multi-gigabit optical transceiver, four different fibers may each contain PAM4 10-gigabit signal for analysis and recalibration. In those example embodiments, the method 500 loops for each fiber lane to analyze each light channel and/or optionally generate and store new calibration values based on the receiver side eye scan data adjustments.

Figure 6:
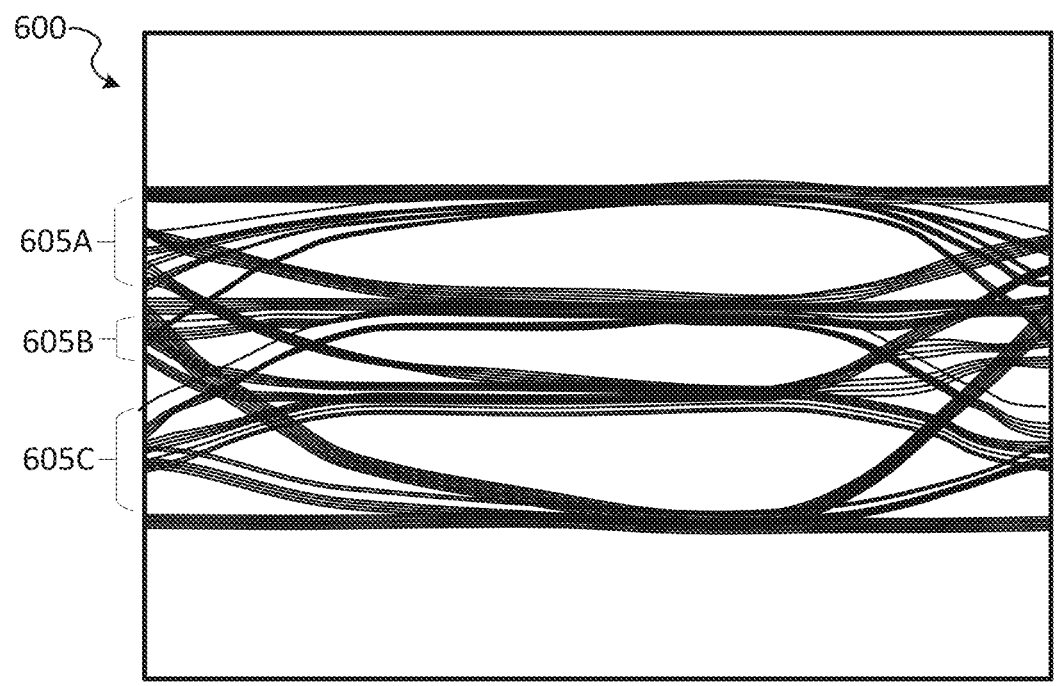
FIG. 6 shows eye diagrams generated by a receiver eye scan module in loopback mode, according to some example embodiments.
Figure 6:
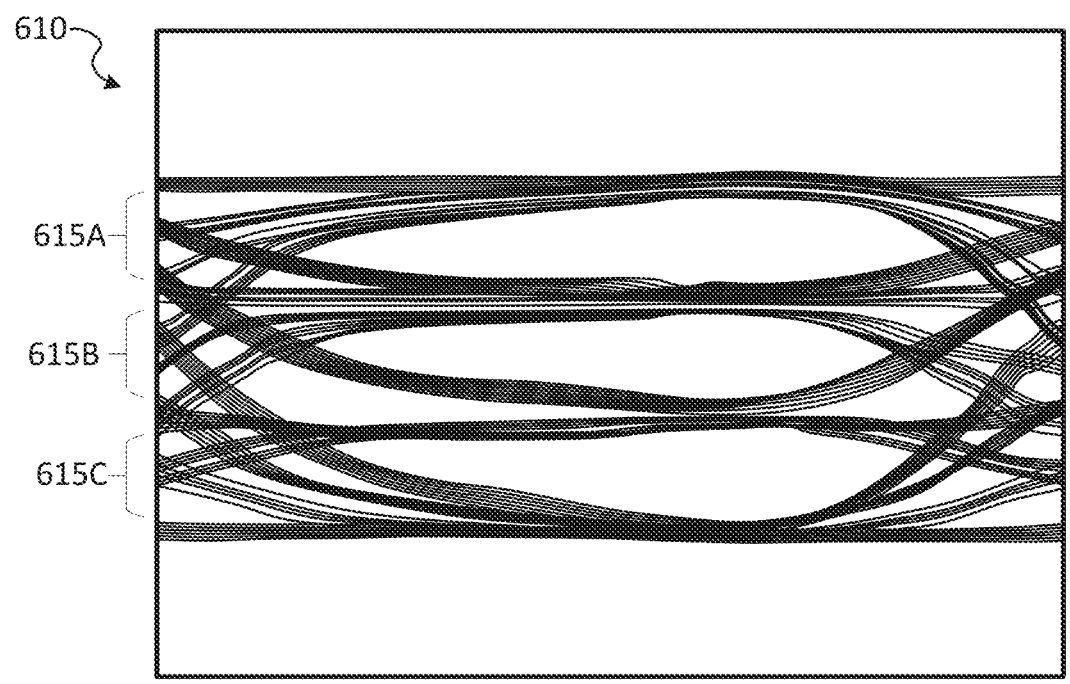

FIG. 6 shows eye diagrams generated by a receiver eye scan module in loopback mode, according to some example embodiments. The eye diagrams 600 and 610 are example PAM4 data visualizations that are generated by the receiver-side eye scan generator 353 and displayed on a display device (e.g., client device screen) during RLM calibration, as discussed above (e.g., operation 415, operation 525). Generally, a quality RLM value is a reading of RLM=1, which indicates that the eyes are nearly or exactly the same shape. In the eye diagram 600, PAM4 signal is displayed with a plurality of eyes 605A-605C due to the four different levels of signal in PAM4. As can be seen, the middle eye 605B is compressed and smaller than the top eye 605A and bottom eye 605C, which can lead to degradation of the PAM4 data.

To correct the compression, the voltage offsets (e.g., D1, D2) of the inner levels (level 1 and level 2) are adjusted to address nonlinearity issues that caused the middle eye to compress. For example, the D1 offset can be set to 0.0 and the D2 offset can be set to 0.2 V, which causes the middle eye to increase in size. For example, in eye diagram 610 (e.g., an example of an RLM calibrated eye diagram), the plurality of eyes 615A-615C have approximately the same size and the RLM value generated by the receiver-side eye scan generator 353 is improved: RLM=0.93 after adjustment, compared to 0.7 before adjustment. Additionally, the RLM can be affected by other values, such as the DC offset of the modulator. In some example embodiments, to address the RLM issues, the DC offset is further calibrated as discussed in further detail below.

Figure 7:
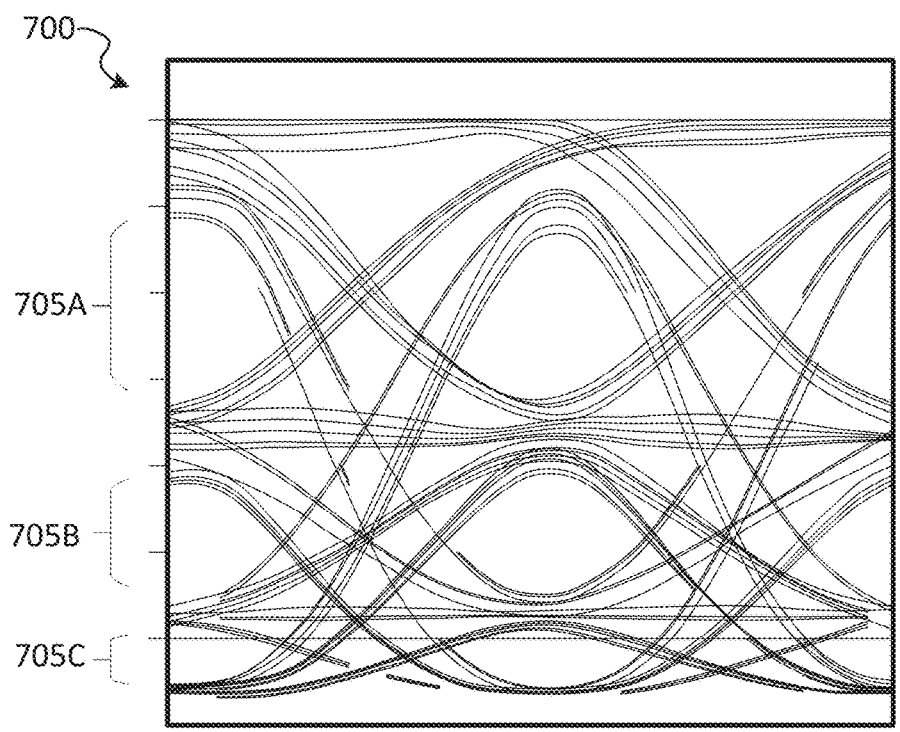
FIG. 7 shows additional eye diagrams for calibration of modulator bias, according to some example embodiments.
Figure 7:
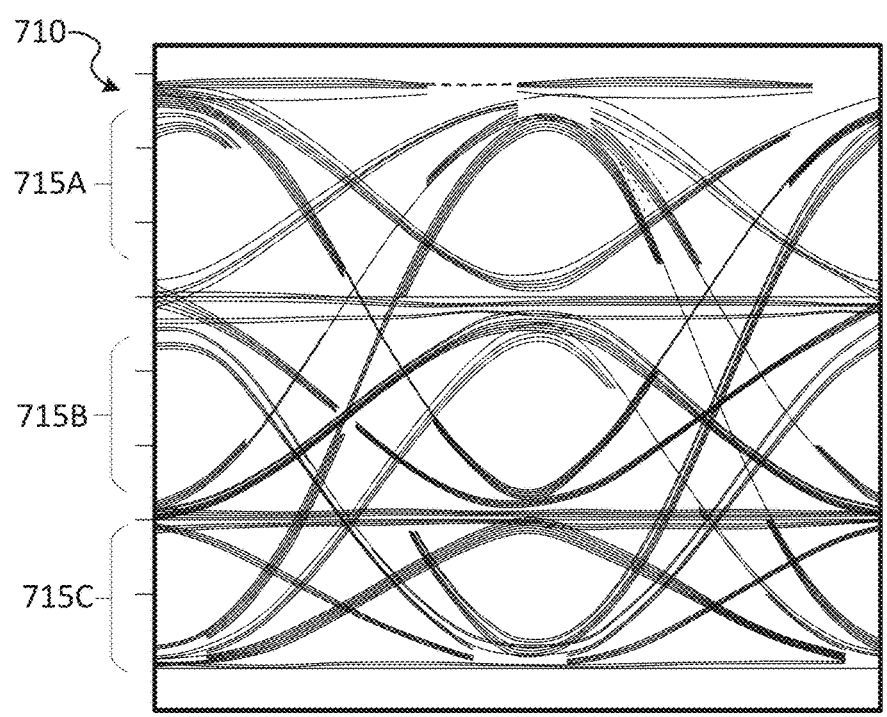

FIG. 7 shows additional eye diagrams 700 and 710 for calibration of modulator bias, according to some example embodiments. Generally, the optical modulator is supplied a bias voltage setting to ensure it blocks and passes light (e.g., modulates) correctly. The incorrect voltage bias setting can result in compression of the PAM4 eye diagram as illustrated in eye diagram 700.

In the eye diagram, the plurality of eyes 705A-705C exhibit compression in that the top eye 705A is largest, and the middle eye 705B and bottom eye 705C are increasingly compressed and lower in position in the eye diagram 700. To correct the compression, the direct current voltage bias supplied to the modulator is adjusted such that a crossing point of the levels is readjusted to result in bias corrected eyes 715A-715C as displayed in eye diagram 710 (e.g., an example of a modulator bias and crossing point corrected eye diagram). In some example embodiments, after the heater is biased for the calibration operations, different bias voltages are applied (e.g., at random) until the crossing point is approximately at the 45% to 50% mark (e.g., as indicated by the middle eye 715B being located approximately in the horizontal middle). In some example embodiments, the swing of the modulator is analyzed to determine an intersection point, which is then used to the set the crossing point bias, as discussed in FIG. 8.

Figure 8:
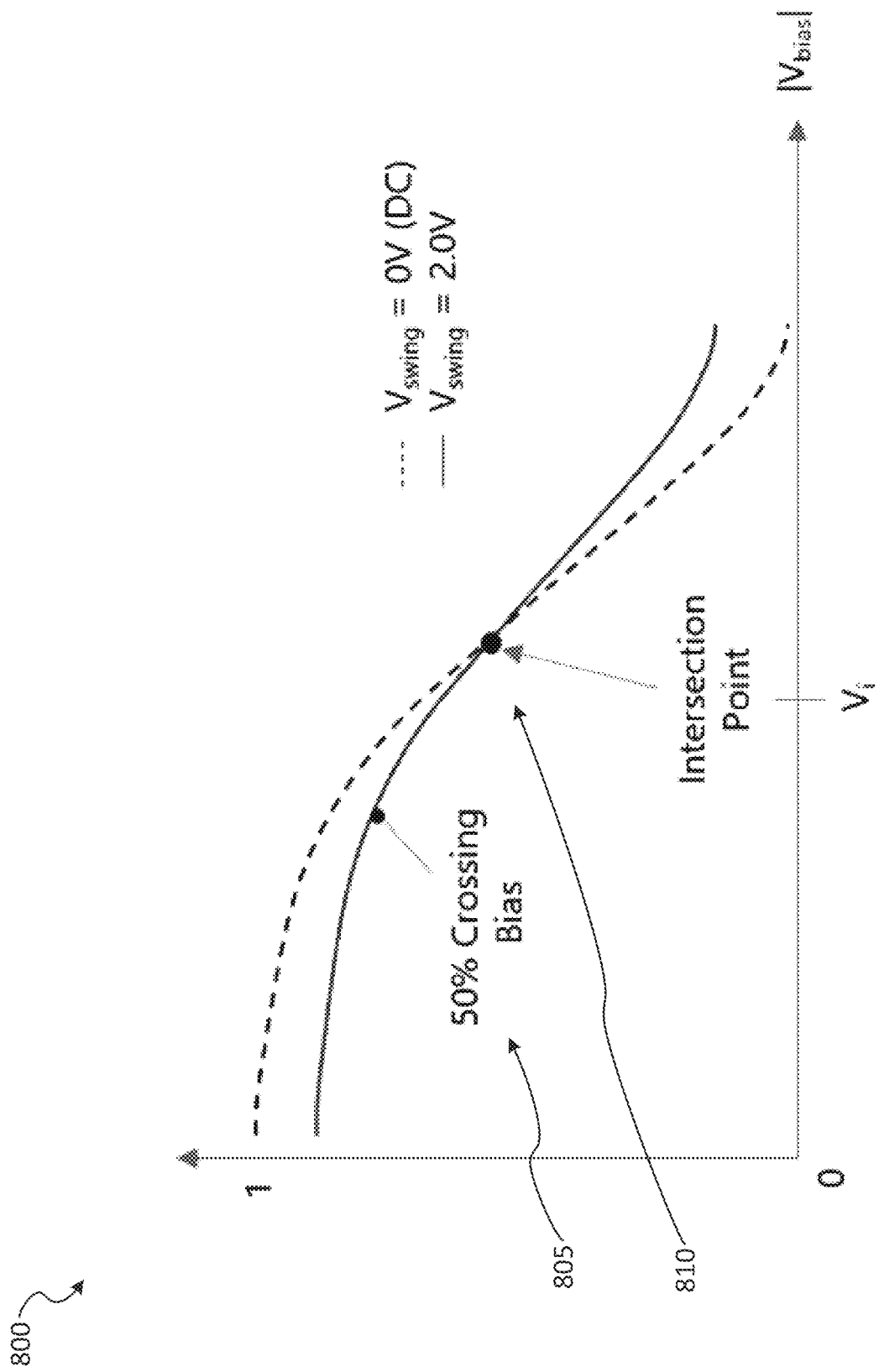
FIG. 8 shows an example electroabsorption modulator (EAM) modulator transfer function graph, according to some example embodiments.

FIG. 8 shows an example EAM modulator transfer function graph 800, according to some example embodiments. The EAM modulator transfer function graph 800 displays the EAM modulator response at different voltage biases (e.g., EAM transmission on the vertical axis, and voltage bias on the horizontal axis). In some example embodiments, the EAM modulator transfer function graph 800 is generated by the PIC controller 315 reading a laser monitor photodiode (e.g., lsr_mpd) between the laser 317 and another monitor photodiode (e.g., eam_mpd) at the output of the modulator 320, to generate the ratio lsr_mpd/eam_mpd for different voltage biases, which is then displayed as the EAM modulator transfer function graph 800 (e.g., on monitor 379, where client device 377 has a data interface to the controllers, e.g., TX controller 303, PIC controller 315, RX controller 350, to access data and adjust settings, e.g., offset values, biases).

In some example embodiments, the swing (peak to peak) of the modulator is varied to generate different sweep curves. For example, a dotted curve denotes the Vswing=0V (DC) and a solid curve denotes Vswing=2.0V. Preferably, the 50% crossing point 805 is identified. However, in practice, finding the 50% crossing point 805 can be difficult. However, to approximate the location of the crossing point 805, in some example embodiments, a plurality of curves are generated at different swings (e.g., Vswing=0V, 0.5V, 1V, 1.5V, 2V), and their intersection point 810 is identified. In some example embodiments, the voltage corresponding to intersection point 805 is determined and utilized to set the crossing point bias of the modulator, thereby correcting compression issues as discussed in FIG. 7. In some example embodiments, the intersection point 810 is first identified, and then a voltage slightly lower than the voltage of the intersection point 810 is set as the crossing point bias as an approximation of the actual 50% crossing point 805.

In some example embodiments, to simulate different operating temperatures, the above calibrations are run for different heater bias values. For example, instead of performing operation 400 once for the heater at 7,000 (e.g., DAC code of 7000), a plurality of heater bias values can be utilized to generate bias values that operate for different temperatures. For example, the heater bias can be set to 3000 DAC code, the RLM and crossing point values can be determined, the heater bias can then be adjusted using the DAC code value 7000, and the RLM and crossing point values can be adjusted as needed (e.g., if they are inaccurate at the new heater bias value). In some example embodiments, for each heater bias value (e.g., 0, 3000, 7000), a set of calibration values are stored at operation 425, in FIG. 4. In operation (e.g., in the field, or integrated into an end product), when the heater bias switches values (e.g., from 3,000 to 7,000) to compensate for a change in ambient temperature (e.g., temperature drop), different calibration values are automatically applied to the transceiver components. For example, the voltage offset values D1 and D2 may be changed in response to the heater bias value changing, thereby keeping the transceiver calibrated as the temperature of the operating environment changes.

FIG. 9 is an illustration of an opto-electrical device 900 (e.g., optical transceiver) including one or more optical devices, according to an embodiment of the disclosure. In this embodiment, the opto-electrical device 900 is shown to include printed circuit board (PCB) substrate 905, organic substrate 910, ASIC 915, and PIC 920. In this embodiment, the PIC 920 may include one or more optical structures described above (e.g., PIC 210).

In some example embodiments, the PIC 920 includes silicon on insulator (SOI) or silicon based (e.g., silicon nitride (SiN)) devices, or may comprise devices formed from both silicon and a non-silicon material. Said non-silicon material (alternatively referred to as "heterogeneous material") may comprise one of III-V material, magneto-optic material, or crystal substrate material. III-V semiconductors have elements that are found in group III and group V of the periodic table (e.g., Indium Gallium Arsenide Phosphide (InGaAsP), Gallium Indium Arsenide Nitride (GaInAsN)). The carrier dispersion effects of III-V based materials may be significantly higher than in silicon based materials, as electron speed in III-V semiconductors is much faster than that in silicon. In addition, III-V materials have a direct bandgap, which enables efficient creation of light from electrical pumping. Thus, III-V semiconductor materials enable photonic operations with an increased efficiency over silicon for both generating light and modulating the refractive index of light. Thus, III-V semiconductor materials enable photonic operation with an increased efficiency at generating light from electricity and converting light back into electricity.

The low optical loss and high quality oxides of silicon are thus combined with the electro-optic efficiency of III-V semiconductors in the heterogeneous optical devices described below; in embodiments of the disclosure, said heterogeneous devices utilize low loss heterogeneous optical waveguide transitions between the devices' heterogeneous and silicon-only waveguides.

Magneto-optic (MO) materials allow heterogeneous PICs to operate based on the MO effect. Such devices may utilize the Faraday Effect, in which the magnetic field associated with an electrical signal modulates an optical beam, offering high bandwidth modulation, and rotates the electric field of the optical mode, enabling optical isolators. Said MO materials may comprise, for example, materials such as such as iron, cobalt, or yttrium iron garnet (YIG). Further, in some example embodiments, crystal substrate materials provide heterogeneous PICs with a high electro-mechanical coupling, linear electro optic coefficient, low transmission loss, and stable physical and chemical properties. Said crystal substrate materials may comprise, for example, lithium niobate ($LiNbO_3$) or lithium tantalate ($LiTaO_3$).

In the example illustrated, the PIC 920 exchanges light with fiber 930 via prism 925; said prism is a misalignment-tolerant device used to couple an optical mode onto a single mode optical fiber, according to some example embodiments. In other example embodiments, multiple fibers are implemented to receive light from the prism 925 for various optical modulation formats (e.g., PAM4; parallel single mode, with four lanes (PSM4)).

In some example embodiments, the optical devices of PIC 920 are controlled, at least in part, by control circuitry included in ASIC 915. In this embodiment, the ASIC 915 may include one or more optical structures described above (e.g., data transmitter 205, data receiver 215, a PIC controller external to PIC 210). Both ASIC 915 and PIC 920 are shown to be disposed on copper pillars 914, which are used for communicatively coupling the PICs via organic substrate 910. PCB 905 is coupled to organic substrate 910 via ball grid array (BGA) interconnect 916 and may be used to interconnect the organic substrate (and thus, ASIC 915 and PIC 920) to other components of the opto-electrical device 900 not shown (e.g., interconnection modules, power supplies, etc.).

Figure 10:
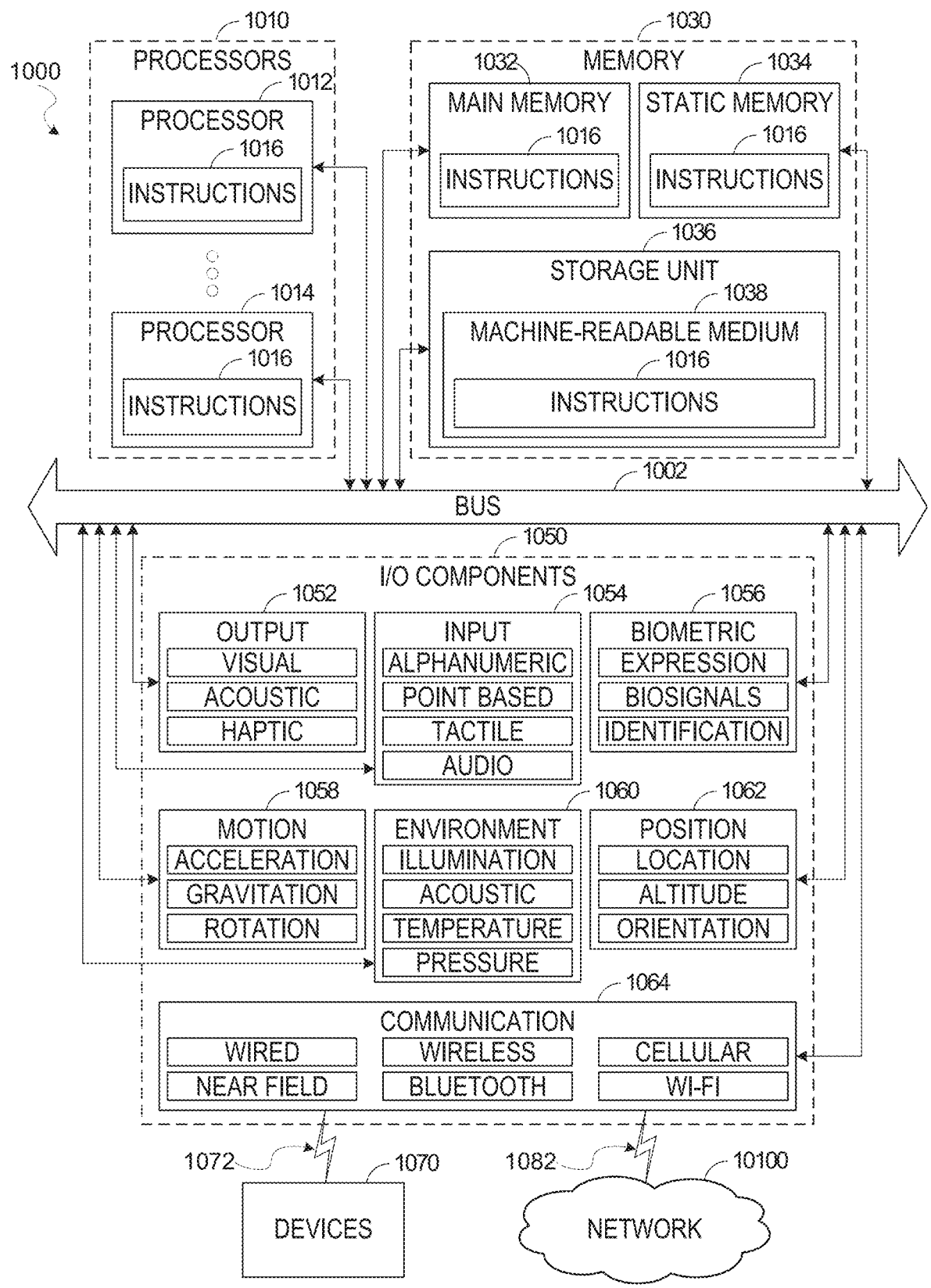
FIG. 10 illustrates example architecture of a machine in the form of a computer system within which a set of instructions may be executed by a processor that causes the machine to implement closed loop preamplification, according to some example embodiments.

FIG. 10 illustrates a diagrammatic representation of a machine 1000 in the form of a computer system within which a set of instructions may be executed for causing the machine to perform any one or more of the methodologies discussed herein, according to an example embodiment. Specifically, FIG. 10 shows a diagrammatic representation of the machine 1000 in the example form of a computer system, within which instructions 1016 (e.g., software, a program, an application, an applet, an app, or other executable code) that are stored on a machine-readable medium 1038 (e.g., memory) for causing the machine 1000 to perform any one or more of the methodologies discussed herein may be executed. The instructions 1016 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 may include processors 1010, memory 1030, and I/O components 1050, which may be configured to communicate with each other such as via a bus 1002. In an example embodiment, the processors 108 (e.g., a CPU, a Reduced Instruction Set Computing (RISC) processor, a Complex Instruction Set Computing (CISC) processor, a Graphics Processing Unit (GPU), a DSP, an ASIC, a Radio-Frequency Integrated Circuit (RFIC), another processor, or any suitable combination thereof) may include, for example, a processor 1012 and a processor 1014 that may execute the instructions 1016. The term "processor" is intended to include multi-core processors that may comprise two or more independent processors (sometimes referred to as "cores") that may execute instructions contemporaneously. Although FIG. 10 shows multiple processors 1010, the machine 1000 may include a single processor with a single core, a single processor with multiple cores (e.g., a multi-core processor), multiple processors with a single core, multiple processors with multiples cores, or any combination thereof.

The memory 1030 may include a main memory 1032, a static memory 1034, and a storage unit 1036, all accessible to the processors 1010 such as via the bus 1002. The main memory 1030, the static memory 1034, and storage unit 1036 store the instructions 1016 embodying any one or more of the methodologies or functions described herein. The instructions 1016 may also reside, completely or partially, within the main memory 1032, within the static memory 1034, within the storage unit 1036, within at least one of the processors 1010 (e.g., within the processor's cache memory), or any suitable combination thereof, during execution thereof by the machine 1000.

The I/O components 1050 may include a wide variety of components to receive input, provide output, produce output, transmit information, exchange information, capture measurements, and so on. The specific I/O components 1050 that are included in a particular machine will depend on the type of machine. For example, portable machines such as mobile phones will likely include a touch input device or other such input mechanisms, while a headless server machine will likely not include such a touch input device. It will be appreciated that the I/O components 1050 may include many other components that are not shown in FIG. 8. The I/O components 1050 are grouped according to functionality merely for simplifying the following discussion and the grouping is in no way limiting. In various example embodiments, the I/O components 1050 may include output components 1052 and input components 1054. The output components 1052 may include visual components (e.g., a display such as a plasma display panel (PDP), a LED display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1054 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1050 may include biometric components 1056, motion components 1058, environmental components 1060, or position components 1062, among a wide array of other components. For example, the biometric components 1056 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1058 may include acceleration sensor components (e.g., accelerometer), gravitation sensor components, rotation sensor components (e.g., gyroscope), and so forth. The environmental components 1060 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1062 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1050 may include communication components 1064 operable to couple the machine 1000 to a network 1080 devices 1070 via a coupling 1082 and a coupling 1072, respectively. For example, the communication components 1064 may include a network interface component or another suitable device to interface with the network 10100. In further examples, the communication components 1064 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1070 may be another machine or any of a wide variety of peripheral devices (e.g., a peripheral device coupled via a USB).

Moreover, the communication components 1064 may detect identifiers or include components operable to detect identifiers. For example, the communication components 1064 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1064, such as location via Internet Protocol (IP) geolocation, location via Wi-Fi® signal triangulation, location via detecting an NFC beacon signal that may indicate a particular location, and so forth.

The various memories (i.e., 1030, 1032, 1034, and/or memory of the processor(s) 1010) and/or storage unit 1036 may store one or more sets of instructions and data structures (e.g., software) embodying or utilized by any one or more of the methodologies or functions described herein. These instructions (e.g., the instructions 1016), when executed by processor(s) 108, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 10100 may be an ad hoc network, an intranet, an extranet, a VPN, a LAN, a WLAN, a WAN, a WWAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 10100 or a portion of the network 10100 may include a wireless or cellular network, and the coupling 1082 may be a Code Division Multiple Access (CDMA) connection, a Global System for Mobile communications (GSM) connection, or another type of cellular or wireless coupling. In this example, the coupling 1082 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1016 may be transmitted or received over the network 10100 using a transmission medium via a network interface device (e.g., a network interface component included in the communication components 1064) and utilizing any one of a number of well-known transfer protocols (e.g., hypertext transfer protocol (HTTP)). Similarly, the instructions 1016 may be transmitted or received using a transmission medium via the coupling 1072 (e.g., a peer-to-peer coupling) to the devices 1070. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1016 for execution by the machine 1000, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The following are example embodiments:

Example 1. A method for calibrating an optical transceiver, the method comprising: generating light from one or more lasers of a transmitter optical circuit in the optical transceiver, the optical transceiver further comprising a receiver optical circuit and a reconfigurable loopback path having an inactive mode and an active mode, the reconfigurable loopback path configured to direct light from the transmitter optical circuit to the receiver optical circuit in the active mode and to not direct light from the transmitter optical circuit to the receiver optical circuit in the inactive mode; generating modulated light using one or more optical modulators in the transmitter optical circuit, the one or more optical modulators generating the modulated light by modulating the light from the one or more lasers; receiving, by the receiver optical circuit, the modulated light from the reconfigurable loopback path in the active mode; generating, by an eye scanner in the receiver optical circuit, eye scan data from the modulated light, the modulated light in the eye scan data having an eye pattern shape; adjusting a modulator setting of the one or more optical modulators in the transmitter optical circuit to generate a calibrated eye pattern shape in the eye scan data from the eye scanner in the receiver optical circuit; and storing, in memory of the optical transceiver, calibration settings that include an adjusted modulator setting that generated the calibrated eye pattern shape.

Example 2. The method of example 1, further comprising: initiating calibration of the optical transceiver at least in part by accessing the calibration settings from the memory in the optical transceiver.

Example 3. The method of any of examples 1 or 2, further comprising: generating additional eye scan data by the eye scanner in the receiver optical circuit, the additional eye scan data generated by receiving additional light from the transmitter optical circuit via the reconfigurable loopback path in the active mode.

Example 4. The method of any of examples 1-3, further comprising: adjusting a current modulator setting of the one or more optical modulators such that an additional eye scan pattern shape in the additional eye scan data matches the calibrated eye pattern shape.

Example 5. The method of any of examples 1-4, wherein the modulator setting is voltage offsets for different modulation levels in the modulated light that affect eye pattern shapes generated by the eye scanner in the receiver optical circuit.

Example 6. The method of any of examples 1-5, wherein the eye pattern shape comprises a plurality of eye openings, and wherein the modulator setting adjusts a shape of one or more of the plurality of eye openings.

Example 7. The method of any of examples 1-6, wherein adjusting the one or more modulator settings comprises: adjusting a direct current (DC) bias point of the modulator that changes a crossing point of the modulator; adjusting a temperature of the modulator by changing a bias value on a heater of the modulator; adjusting a voltage swing provided to the modulator; and adjusting an equalization of signal delivered to the modulator to generate the modulated light.

Example 8. The method of any of examples 1-7, further comprising: displaying the calibrated eye pattern shape on a display device.

Example 9. The method of any of examples 1-8, wherein the display device is a client device display device.

Example 10. The method of any of examples 1-9, wherein the client device receives eye scan data from the optical transceiver using a data interface.

Example 11. The method of any of examples 1-10, wherein the one or more optical modulators are one or more electro-absorption modulators.

Example 12. The method of any of examples 1-11, wherein a majority of the light is not transmitted from the transmitter optical circuit to the receiver optical circuit while the reconfigurable loopback path is in the inactive mode.

Example 13. The method of any of examples 1-12, wherein the reconfigurable loopback path comprises an integrated waveguide from the transmitter optical circuit to the receiver optical circuit.

Example 14. The method of any of examples 1-13, wherein the reconfigurable loopback path is in the active mode in response to one or more switches of the integrated waveguide switching to enable the light to propagate from the transmitter optical circuit to the receiver optical circuit along the integrated waveguide.

Example 15. The method of any of examples 1-14, wherein the transmitter optical circuit comprises a transmitter photonic integrated circuit to generate the light and a transmitter electrical integrated circuit to control modulation of the light.

Example 16. The method of any of examples 1-15, wherein the receiver optical circuit comprises a receiver photonic integrated circuit to receive light and a receiver electrical integrated circuit to process data in the light received by the receiver photonic integrated circuit.

Example 17. The method of any of examples 1-16, wherein the modulated light is pulse amplitude modulated 4-level (PAM4) light.

Example 18. An optical transceiver comprising: a transmitter optical circuit comprising one or more lasers to generate light and one or more optical modulators to generate modulated light by modulating the light from the one or more lasers; a receiver optical circuit comprising an eye scanner to generate eye scan data having an eye pattern shape; a reconfigurable loopback path having an inactive mode and an active mode, the reconfigurable loopback path configured to direct light from the transmitter optical circuit to the receiver optical circuit in the active mode and to not direct light from the transmitter optical circuit to the receiver optical circuit in the inactive mode, wherein the eye scanner generates eye scan data from the modulated light received via the reconfigurable loopback path in the active mode, and the one or more optical modulators have an adjustable modulator setting that can be adjusted while the eye scanner generates the eye scan data from the modulated light to generate a calibrated eye pattern shape in the eye scan data; and a memory to store an adjusted modulator setting that generates the calibrated eye pattern shape.

Example 19. The optical transceiver of example 18, wherein the modulator setting is voltage offsets for different modulation levels in the modulated light that affect eye pattern shapes generated by the eye scanner in the receiver optical circuit.

Example 20. The optical transceiver of any of examples 18 or 19, wherein the modulated light is pulse amplitude modulated 4-level (PAM4) light.

In the foregoing detailed description, the method and apparatus of the present inventive subject matter have been described with reference to specific exemplary embodiments thereof. It will, however, be evident that various modifications and changes may be made thereto without departing from the broader spirit and scope of the present inventive subject matter. The present specification and figures are accordingly to be regarded as illustrative rather than restrictive.

What is claimed is:

1. A method for calibrating an optical transceiver, the method comprising:
   generating light from one or more lasers of a transmitter optical circuit in the optical transceiver, the optical transceiver further comprising a receiver optical circuit and a reconfigurable loopback path having an inactive mode and an active mode, the reconfigurable loopback path configured to direct light from the transmitter optical circuit to the receiver optical circuit in the active mode and to not direct light from the transmitter optical circuit to the receiver optical circuit in the inactive mode;
   generating modulated light using one or more optical modulators in the transmitter optical circuit, the one or more optical modulators generating the modulated light by modulating the light from the one or more lasers;
   receiving, by the receiver optical circuit, the modulated light from the reconfigurable loopback path in the active mode;
   generating, by an eye scanner in the receiver optical circuit, eye scan data from the modulated light, the modulated light in the eye scan data having an eye pattern shape;
   adjusting one or more modulator settings of the one or more optical modulators in the transmitter optical circuit to generate a calibrated eye pattern shape in the eye scan data from the eye scanner in the receiver optical circuit, the one or more modulator settings comprising voltage offsets for different modulation levels in the modulated light that affect the eye pattern shape; and
   storing, in memory of the optical transceiver, calibration settings that include an adjusted set of modulator settings that generated the calibrated eye pattern shape.

2. The method of claim 1, further comprising: initiating calibration of the optical transceiver at least in part by accessing the calibration settings from the memory in the optical transceiver.

3. The method of claim 2, further comprising:
   generating additional eye scan data by the eye scanner in the receiver optical circuit, the additional eye scan data generated by receiving additional light from the transmitter optical circuit via the reconfigurable loopback path in the active mode.

4. The method of claim 3, further comprising:
   adjusting a current modulator setting of the one or more optical modulators such that an additional eye scan pattern shape in the additional eye scan data matches the calibrated eye pattern shape.

5. The method of claim 1, wherein the eye pattern shape comprises a plurality of eye openings; and
wherein the one or more modulator settings adjusts a shape of one or more of the plurality of eye openings.

6. The method of claim 1, wherein adjusting the one or more modulator settings comprises:
adjusting a direct current (DC) bias point of the one or more modulators that changes a crossing point of the one or more modulators;
adjusting a temperature of the one or more modulators by changing a bias value on a heater of the one or more modulators;
adjusting a voltage swing provided to the one or more modulators; and
adjusting an equalization of signal delivered to the one or more modulator- to generate the modulated light.

7. The method of claim 1, further comprising:
displaying the calibrated eye pattern shape on a display device.

8. The method of claim 7, wherein the display device is an external display of a client device.

9. The method of claim 8, wherein the client device receives the scan data from the optical transceiver using a data interface.

10. The method of claim 1, wherein the one or more optical modulators are one or more electro-absorption modulators.

11. The method of claim 1, wherein a majority of the light is not transmitted from the transmitter optical circuit to the receiver optical circuit while the reconfigurable loopback path is in the inactive mode.

12. The method of claim 1, wherein the reconfigurable loopback path comprises an integrated waveguide from the transmitter optical circuit to the receiver optical circuit.

13. The method of claim 12, wherein the reconfigurable loopback path is in the active mode in response to one or more switches of the integrated waveguide switching to enable the light to propagate from the transmitter optical circuit to the receiver optical circuit along the integrated waveguide.

14. The method of claim 1, wherein the transmitter optical circuit comprises a transmitter photonic integrated circuit to generate the light and a transmitter electrical integrated circuit to control modulation of the light.

15. The method of claim 1, wherein the receiver optical circuit comprises a receiver photonic integrated circuit to receive light and a receiver electrical integrated circuit to process data in the light received by the receiver photonic integrated circuit.

16. The method of claim 1, wherein the modulated light is pulse amplitude modulated 4-level (PAM4) light.

17. An optical transceiver comprising:
a transmitter optical circuit comprising one or more lasers to generate light and one or more optical modulators to generate modulated light by modulating the light from the one or more lasers;
a receiver optical circuit comprising an eye scanner to generate eye scan data having an eye pattern shape;
a reconfigurable loopback path having an inactive mode and an active mode, the reconfigurable loopback path configured to direct light from the transmitter optical circuit to the receiver optical circuit in the active mode and to not direct light from the transmitter optical circuit to the receiver optical circuit in the inactive mode, wherein the eye scanner generates the eye scan data from the modulated light received via the reconfigurable loopback path in the active mode, and the one or more optical modulators have one or more adjustable voltage offsets for different modulation levels in the modulated light to generate a calibrated eye pattern shape in the eye scan data; and
a memory to store an adjusted voltage offset that generates the calibrated eye pattern shape.

18. The optical transceiver of claim 17, wherein the modulated light is pulse amplitude modulated 4-level (PAM4) light.

19. The optical transceiver of claim 17, further comprising a data interface to transmit the eye scan data to an external display device for display.

20. The optical transceiver of claim 17, wherein the one or more optical modulators are one or more electro-absorption modulators.

* * * * *